(12) United States Patent
Mohammed et al.

(10) Patent No.: US 11,914,148 B2
(45) Date of Patent: Feb. 27, 2024

(54) STACKED OPTICAL WAVEGUIDES

(71) Applicant: ADEIA SEMICONDUCTOR INC., San Jose, CA (US)

(72) Inventors: Ilyas Mohammed, Santa Clara, CA (US); Rajesh Katkar, Milpitas, CA (US); Belgacem Haba, Saratoga, CA (US)

(73) Assignee: Adeia Semiconductor Inc., San Jose, CA (US)

( * ) Notice: Subject to any disclaimer, the term of this patent is extended or adjusted under 35 U.S.C. 154(b) by 397 days.

(21) Appl. No.: 16/124,617

(22) Filed: Sep. 7, 2018

(65) Prior Publication Data
US 2020/0081251 A1   Mar. 12, 2020

(51) Int. Cl.
*G02B 27/14* (2006.01)
*G02B 27/01* (2006.01)
*F21V 8/00* (2006.01)

(52) U.S. Cl.
CPC ....... *G02B 27/0172* (2013.01); *G02B 6/0035* (2013.01); *G02B 6/0076* (2013.01); *G02B 27/144* (2013.01); *G02B 2027/0178* (2013.01)

(58) Field of Classification Search
CPC ............... G02B 6/0076; G02B 6/0035; G02B 27/0172; G02B 27/144; G02B 27/1066; G02B 27/145; G02B 2027/0178; G02B 2027/0127; G02B 2027/0185
USPC .................................. 359/629, 630, 633, 636
See application file for complete search history.

(56) References Cited

U.S. PATENT DOCUMENTS

| | | | |
|---|---|---|---|
| 5,224,198 A | 6/1993 | Jachimowicz et al. | |
| 6,829,095 B2 | 12/2004 | Amitai | |
| 8,189,263 B1 | 5/2012 | Wang et al. | |
| 8,432,614 B2 | 4/2013 | Amitai | |
| 8,466,953 B2 | 6/2013 | Levola | |
| 8,950,867 B2 | 2/2015 | Macnamara | |
| 8,965,152 B2 * | 2/2015 | Simmonds | G02B 27/0101 385/27 |
| 9,494,800 B2 | 11/2016 | Border et al. | |
| 9,513,480 B2 | 12/2016 | Saarikko et al. | |
| 2006/0291021 A1 * | 12/2006 | Mukawa | G02B 27/0944 359/15 |
| 2010/0220261 A1 * | 9/2010 | Mizushima | G02F 1/133615 362/606 |
| 2015/0002528 A1 * | 1/2015 | Bohn | G02B 27/0172 345/589 |
| 2015/0016777 A1 * | 1/2015 | Abovitz | G02B 27/0172 385/37 |
| 2016/0026253 A1 | 1/2016 | Bradski et al. | |
| 2017/0248750 A1 * | 8/2017 | Curtis | G02B 27/0172 |
| 2017/0276940 A1 | 9/2017 | Popovich et al. | |
| 2017/0356801 A1 | 12/2017 | Popovich et al. | |
| 2017/0357841 A1 | 12/2017 | Popovich et al. | |

(Continued)

FOREIGN PATENT DOCUMENTS

| | | | | | |
|---|---|---|---|---|---|
| CN | 107024769 A | * | 8/2017 | ............. | G02B 27/00 |
| CN | 108873355 A | * | 11/2018 | ......... | G02B 27/0172 |

*Primary Examiner* — Mahidere S Sahle
(74) *Attorney, Agent, or Firm* — Haley Guiliano LLP (57) ABSTRACT

An optical apparatus is provided comprising: first and second optical waveguides disposed in a substrate such that light reflected by a beam splitting optical element of the first waveguide passes between beam splitting elements of the second waveguide.

20 Claims, 6 Drawing Sheets

(56) References Cited

U.S. PATENT DOCUMENTS

2018/0003981 A1  1/2018  Urey
2018/0284440 A1* 10/2018 Popovich ............. G02B 6/0076

* cited by examiner

STACKED OPTICAL WAVEGUIDES

BACKGROUND

Optical waveguides often are used in thin smart glasses for Augmented Reality/Mixed Reality (AR/MR) applications. A light image injected at an edge of an eyepiece may be transmitted through total internal reflection to a waveguide that projects the light image to a viewer's eye. However, many optical waveguides are limited to a single focal plane. Moreover, manufacture of optical waveguides can be complex and expensive.

Figure 1:
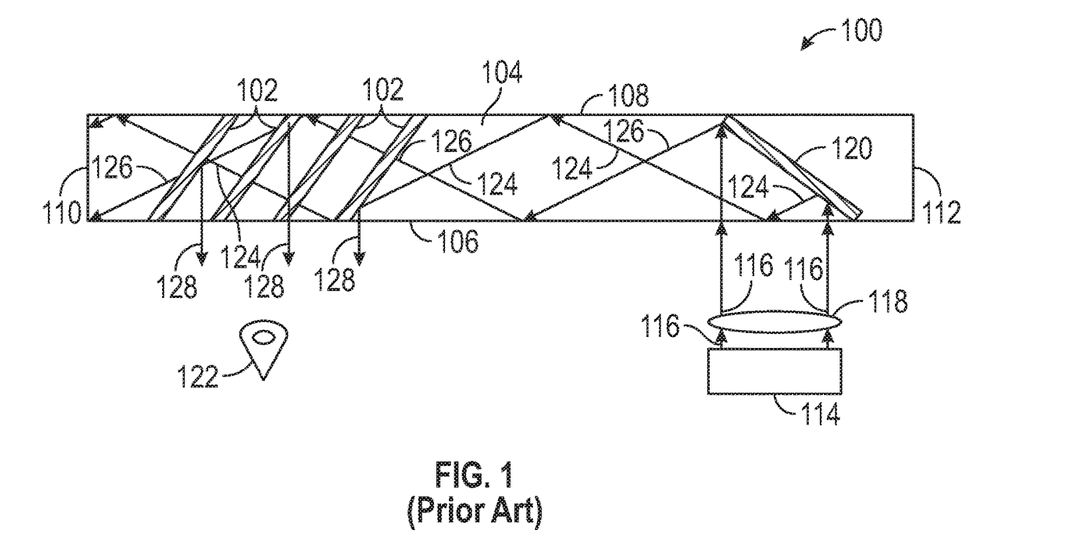
FIG. 1 is an illustrative drawing representing a mirrored waveguide display system including multiple partially transparent mirrors embedded within a transparent substrate.

FIG. 1 is an illustrative drawing representing a mirrored waveguide display system 100 including multiple partially transparent mirrors 102 embedded within a planar substrate 104 that is transparent to incident light. The substrate 104 includes first and second opposed major surfaces 106, 108 and first and second opposed edge surfaces 110, 112. An image display source 114 produces a display image 116. Often, the image display source 114 includes a liquid crustal on semiconductor (LCoS), LCD, micro LED or an OLED display, for example. A collimating lens 118 collimates light of the display image 116, which is coupled collimated light into the substrate 104 in a direction normal to the first major surface 106 of the substrate 104 to illuminate a reflecting surface 120 embedded within the substrate 104. The reflecting surface 120 reflects the incident light 116 received from the image display source 114 source at an angle such that the reflected light is trapped inside the planar substrate 104 between the first and second major surfaces 106, 108 by total internal reflection. After one or more reflections inside the substrate 104, the trapped light waves reach a sequence of partially reflecting mirror surfaces 102 arranged in parallel, which couple a portion 128 of the reflected light out of the substrate 104 in a direction normal to the substrate first major surface 106 of the substrate 104, into the eye 122 of a viewer. More specifically, the trapped reflected light rays arrive at the partially reflecting mirrors 102 from two different directions indicated by arrows 124, 126. In some embodiments, trapped rays arrive at the partially reflecting mirrors from a first direction 124 after an even number of reflections from the opposed first and second major surfaces 106, 108, and rays arrive at the partially reflecting mirrors 102 from a second direction 126 after an odd number of reflections from the opposed first and second major substrate surfaces 106, 108. Partially reflective mirrors, as reported in U.S. Pat. No. 6,829,095, can be used. In accordance with some embodiments, rays incident upon a mirror surface 102 at a prescribed off-axis angle to the surface are partially reflected 128 and coupled out of the substrate 104 through the first major surface 106, and rays incident upon a mirror surface close to normal to the mirror surface 102 are transmitted through the mirror surface 102 without significant reflection. The partially transparent mirror surfaces typically include a dichroic coating that determines reflectance of the surfaces, which may vary with the angle of incident of light upon the mirror surface 102.

It will be appreciated that Very high angle rays (i.e. greater than about 45 degrees) are always reflected at surfaces 106, 108 and even at mirrors 102 due to Total Internal Reflection (TIR). However, the optics may be arranged such that almost all the wave front is at high angle (greater than 45 degrees) to surfaces 106 and 108 so light is trapped due to TIR; and light reflected off surfaces 106/108 becomes at a shallow angle to mirrors 102. Since they are partially reflective, depending on their reflectance, some light goes through and other is reflected. Last mirror may reflect one hundred percent to capture all light.

Figure 2:
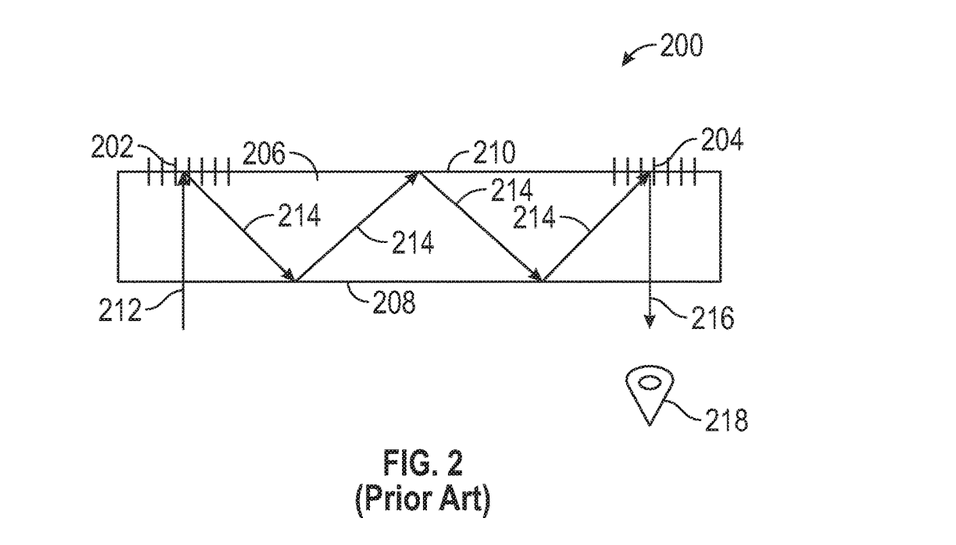
FIG. 2 is an illustrative drawing representing a grating-based waveguide display system including gratings that may be disposed in or on a transparent substrate.

FIG. 2 is an illustrative drawing representing a grating-based waveguide display system 200 including input gratings 202 and output gratings 204 that may be disposed in or on a substrate 206 that is transparent to incident light. The display system 200 uses total internal reflection between first and second opposed major surfaces 208, 210 of the substrate like the display system 100 of FIG. 1, but uses diffraction gratings, which may also be holographic, in place of partially transparent mirrors. Such waveguide using surface etched partially reflective mirrors, as reported in U.S. Pat. No. 8,189,263, can also be used. Collimated light 212 is coupled in, perpendicular to the first major surface 208 of the substrate 206 at the input gratings 202, which diffracts the incident input light. The diffracted input light is trapped inside the substrate by total internal reflection. After one or more internal reflections 214, the output gratings 204, which diffracts the reflected light to couple output light 216 out of the substrate 206 in a direction normal to the first major substrate surface 208, into the eye 218 of a viewer.

SUMMARY

In example one aspect, an optical apparatus is provided that includes a substrate transparent to incident light. A first waveguide including multiple beam splitting elements is disposed within the substrate. A second waveguide including multiple beam splitting elements also is disposed within the substrate. The first and second waveguides are disposed in the substrate such that light reflected by a beam splitting optical element of the first waveguide passes between beam splitting elements of the second waveguide.

In another example aspect, an optical apparatus is provided that includes a substrate transparent to incident light and that includes opposed first and second major surfaces. A first waveguide including multiple beam splitting elements is disposed within the substrate. A second waveguide including multiple beam splitting elements also is disposed within the substrate. The first and second waveguides are disposed in the substrate substantially equally distant from the first major surface, such that no light reflected by a beam splitting optical element of the first waveguide passes between beam splitting elements of the second waveguide.

In another example aspect, a method to produce an optical waveguide is provided. A surface contour is produced that includes peaks and valleys, in a first major surface of a transparent substrate material. A coating material is upon valley portions of the substrate to produce a partially reflective mirror surface portions thereon. A transparent filler material is deposited upon the substrate and the coating material to fill the valleys with the coating material. The first major surface of the transparent substrate material with the coating material deposited thereon and the filler material deposited thereon are polished to remove portions of the substrate on which the coating is deposited to produce plateaus, which are disposed between valleys deposited with coating and with filler, and which do not have coating deposited thereon.

DESCRIPTION OF EMBODIMENTS

FIG. 1 is an illustrative drawing representing a mirrored waveguide display system 100 including multiple partially transparent mirrors 102 embedded within a planar substrate 104 that is transparent to incident light. The substrate 104 includes first and second opposed major surfaces 106, 108 and first and second opposed edge surfaces 110, 112. An image display source 114 produces a display image 116. Often, the image display source 114 includes a liquid crustal on semiconductor (LCoS), LCD, micro LED or an OLED display, for example. A collimating lens 118 collimates light of the display image 116, which is coupled collimated light into the substrate 104 in a direction normal to the first major surface 106 of the substrate 104 to illuminate a reflecting surface 120 embedded within the substrate 104. The reflecting surface 120 reflects the incident light 116 received from the image display source 114 source at an angle such that the reflected light is trapped inside the planar substrate 104 between the first and second major surfaces 106, 108 by total internal reflection. After one or more reflections inside the substrate 104, the trapped light waves reach a sequence of partially reflecting mirror surfaces 102 arranged in parallel, which couple a portion 128 of the reflected light out of the substrate 104 in a direction normal to the substrate first major surface 106 of the substrate 104, into the eye 122 of a viewer. More specifically, the trapped reflected light rays arrive at the partially reflecting mirrors 102 from two different directions indicated by arrows 124, 126. In some embodiments, trapped rays arrive at the partially reflecting mirrors from a first direction 124 after an even number of reflections from the opposed first and second major surfaces 106, 108, and rays arrive at the partially reflecting mirrors 102 from a second direction 126 after an odd number of reflections from the opposed first and second major substrate surfaces 106, 108. Partially reflective mirrors, as reported in U.S. Pat. No. 6,829,095, can be used. In accordance with some embodiments, rays incident upon a mirror surface 102 at a prescribed off-axis angle to the surface are partially reflected 128 and coupled out of the substrate 104 through the first major surface 106, and rays incident upon a mirror surface close to normal to the mirror surface 102 are transmitted through the mirror surface 102 without significant reflection. The partially transparent mirror surfaces typically include a dichroic coating that determines reflectance of the surfaces, which may vary with the angle of incident of light upon the mirror surface 102.

It will be appreciated that Very high angle rays (i.e. greater than about 45 degrees) are always reflected at surfaces 106, 108 and even at mirrors 102 due to Total Internal Reflection (TIR). However, the optics may be arranged such that almost all the wave front is at high angle (greater than 45 degrees) to surfaces 106 and 108 so light is trapped due to TIR; and light reflected off surfaces 106/102 becomes at a shallow angle to mirrors 102. Since they are partially reflective, depending on their reflectance, some light goes through and other is reflected. Last mirror may reflect one hundred percent to capture all light.

FIG. 2 is an illustrative drawing representing a grating-based waveguide display system 200 including input gratings 202 and output gratings 204 that may be disposed in or on a substrate 206 that is transparent to incident light. The display system 200 uses total internal reflection between first and second opposed major surfaces 208, 210 of the substrate like the display system 100 of FIG. 1, but uses diffraction gratings, which may also be holographic, in place of partially transparent mirrors. Such waveguide using surface etched partially reflective mirrors, as reported in U.S. Pat. No. 8,189,263, can also be used. Collimated light 212 is coupled in, perpendicular to the first major surface 208 of the substrate 206 at the input gratings 202, which diffracts the incident input light. The diffracted input light is trapped inside the substrate by total internal reflection. After one or more internal reflections 214, the output gratings 204, which diffracts the reflected light to couple output light 216 out of the substrate 206 in a direction normal to the first major substrate surface 208, into the eye 218 of a viewer.

Figure 3:
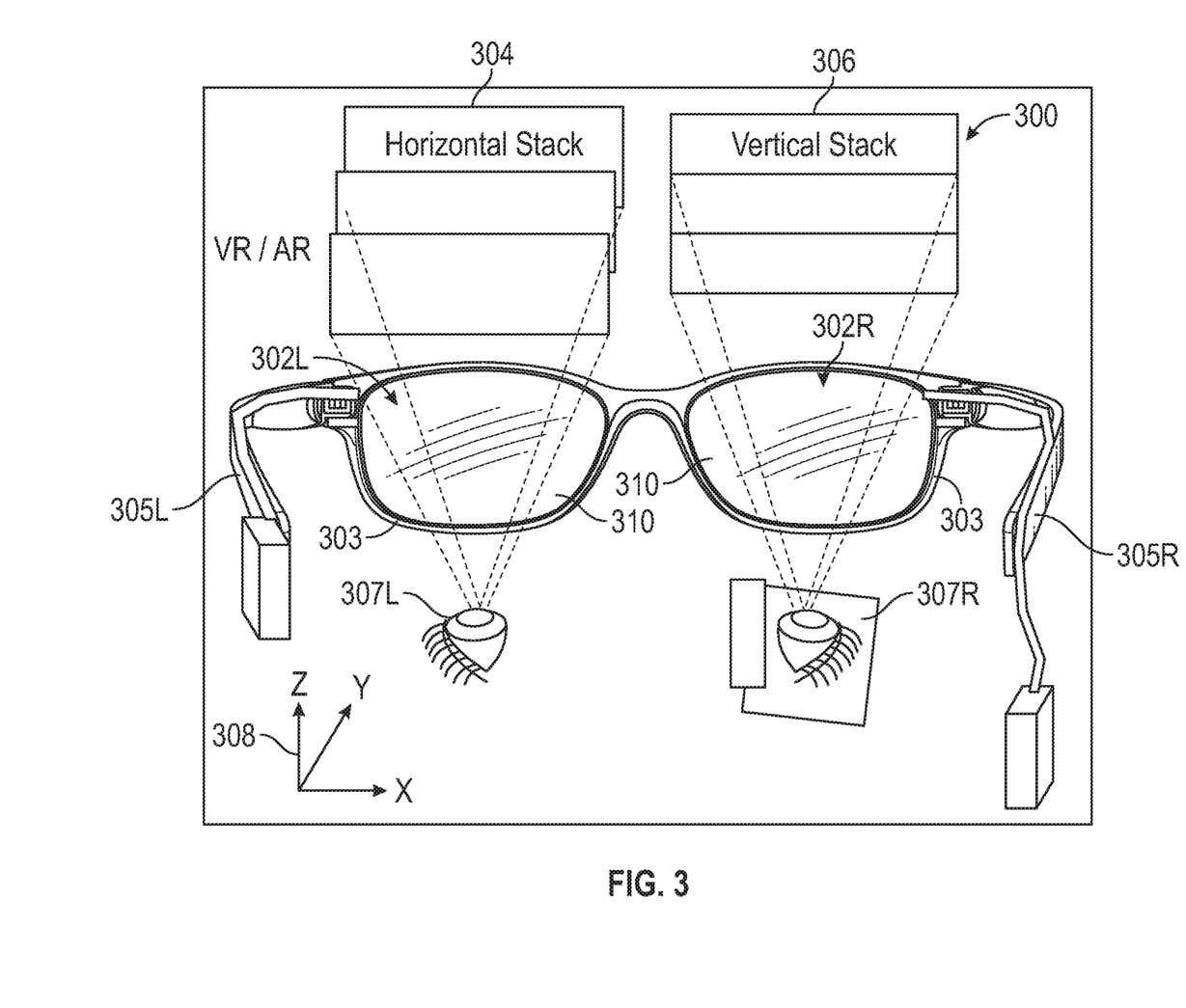
FIG. 3 is an illustrative drawing showing a rear perspective view of a headset in which a left eyepiece has vertically stacked waveguides (WGs) and the right eyepiece has horizontally stacked WGs.

FIG. 3 is an illustrative drawing showing a rear perspective view of a headset 300 looking through the left and right eyepieces 302L, 302R from a viewer's perspective in which the left eyepiece 302L includes multiple vertically stacked optical waveguides (WGs) 304 and the right eyepiece 302R includes multiple horizontally stacked optical WGs 306. The first eye pieces 302L, 302R are mounted within a frame 303 that includes left and right legs 305L, 305R. Each eyepiece 302L, 302R may include a substrate 310 that is transparent to incident light to support the stacked WGs 304, 306, respectively. The substrate 310 of each eyepiece 302L, 302R has a substantially planar contour. The substrate 310 of each eyepiece 302L, 302R includes opposed first (back) and second (front) major surfaces 352, 354. The first major surface 352 (shown in FIGS. 4A-4B and FIGS. 5A-5B) faces away from the external world, which may be real or virtual, and toward a user's eyes 307L, 307R. The second major surface 354. The second major surface 354 (shown in FIGS. 4A-4B and FIGS. 5A-5B) faces away from the user's eyes 307L, 307R and toward the external world. An illustrative (x, y, z) coordinate system 308 is provided as reference to indicate vertical and horizontal directions discussed in this description. In this disclosure, the vertical direction corresponds to the z direction in the coordinate system 308, which extends between vertically spaced apart upper and lower minor surfaces 310U, 310L of the substrate 310. In this disclosure, the horizontal direction corresponds to the y direction in the coordinate system 308, which extends between back and front major surfaces 352, 354 of the substrate 310. The illustrative horizontally and vertically stacked WGs 304, 306 project images to a viewer's left and right eyes 307L, 307R, respectively. The substrate 310 may be fabricated of a variety of optically transmissive, light guiding materials, such as polymer, quartz, or glass, for example. Alternatively, the substrate 310 may be formed of two materials, a first surface etched substrate material and a second filler material. The second material should be flowable material (at least at high temp of <300-400 C), e.g. plastic, glass. Outer surfaces of the stacked WGs 304, 306 may be planar or curved (not shown). It will be appreciated that different stacking arrangements of WGs are shown in the left and right eyepieces 302L, 302R for ease of illustration and explanation and that in use, both the left and right eyepieces typically will have either all vertically stacked WGs or all horizontally stacked WGs. In another embodiment, only one eyepiece may have the stacked optical waveguide of either type, and other eyepiece may have a transparent substrate 310. For example, a right eyepiece of the headset may have vertically stacked optical waveguide, while left eyepiece of the headset may be plane transparent substrate. Also, to simplify the description, only three stacked WGs in each eyepiece are shown and described. However, it will be appreciated that a larger number of stacked WGs may be included, such as ten or twenty stacked WGs, for example.

Figure 4A:
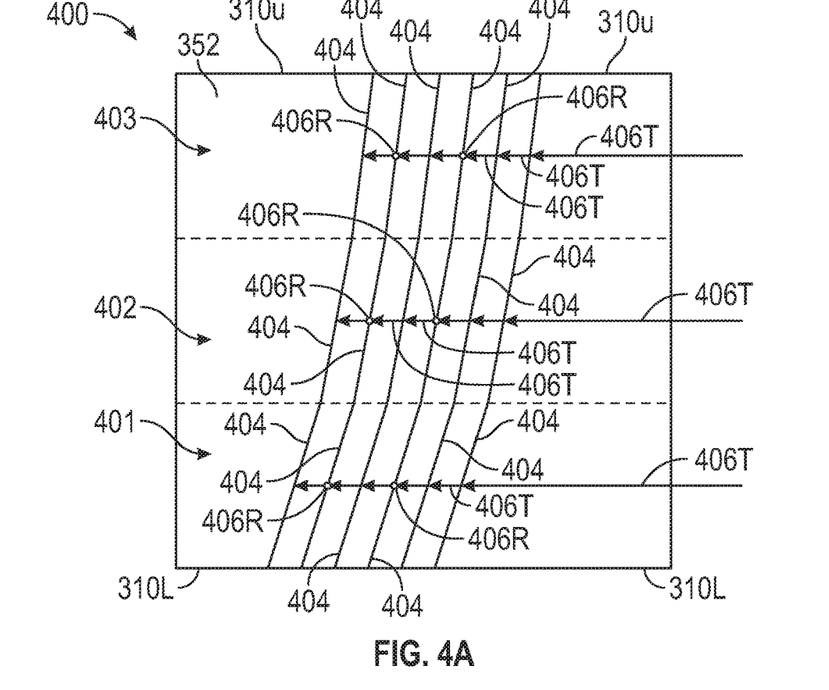
FIGS. 4A-4B are illustrative drawings of front views showing light ray paths within the first and second vertically stacked WG embodiments of FIG. 3.
Figure 4B:
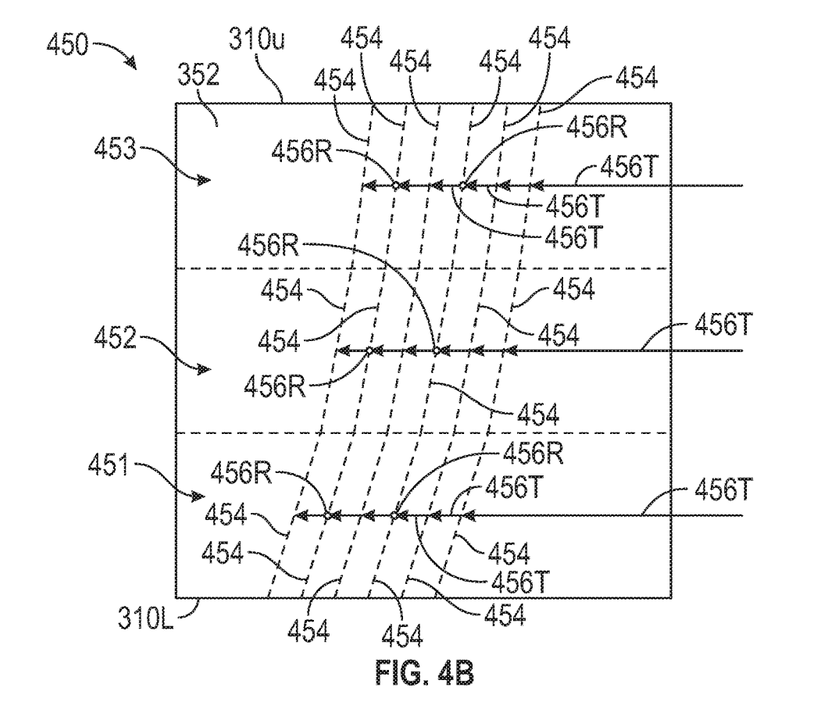

FIGS. 4A-4B are illustrative drawings showing light ray paths within a front view of first and second non-overlapping vertically stacked WG embodiments 400, 450 of FIG. 3. As explained below, the WGs are non-overlapping since no reflected light from beam splitting surfaces any one of the WGs passes between beam splitting surfaces of another. Also, as explained below, the WGs are vertically stacked since each WG is vertically spaced apart from the other WGs at substantially the same distance from the first and second major surfaces 352, 354.

Referring to FIG. 4A represents the illustrative first non-overlapping, vertically stacked WG embodiment 400, which includes first, second and third vertically stacked WGs 401, 402, 403 at a substrate 310, which include individual corresponding beam splitting surfaces 404. In some embodiments, the beam splitting surfaces 404 include beam splitting partially transparent mirrors. The arrows 406T in first non-overlapping, vertically stacked WG embodiment 400 represent the paths of light transmitted substantially parallel to the first and second major surfaces 352, 354, through the respective vertically stacked WGs 401-403. The dots 406R represent reflected light emitted from the WGs 401-403 perpendicular to a first major surface of the substrate 352. Individual beam splitting surfaces 404 transmit a portion of light incident upon it parallel to the first and second major surfaces 352 and reflect a portion of light incident upon it toward the first major surface 352. Thus, the dots 406R represent portions of the light reflected from the beam splitting mirrors 404 and emitted through the first major surface 352 of the substrate 310. The light is emitted from the substrate 310 substantially perpendicular to the first major surface 352.

Each of the vertically stacked WG 401-403 extends within the substrate 310 substantially parallel to the first major surface 352 at substantially the same horizontal distance from the first major surface 352 as the other WGs. The substrate includes opposed, vertically spaced apart, upper and lower minor surfaces 310U, 310L. The first WG 401 is disposed within the substrate 310 spaced vertically closest to a first (lower) minor surface 310L. The third WG 403 is disposed within the substrate 310 spaced vertically closest to the second (upper) minor surface 3010U. The second WG 402 is vertically disposed within the substrate 310 between the first and third WGs 401, 403. In some embodiments, the first, second and third WGs 401-403 are substantially equally distant from the first major surface 352.

The non-overlapping vertically stacked WGs 401-403 are disposed such that no reflected light from a beam splitting surface of one of the WGs passes between beam splitting surfaces of another WG. Thus, the vertically stacked WGs 401-403 are arranged such that each WG emits light on a different vertically separated light path towards the eye of the user that does not intersect with the other two vertically stacked WGs. Thus, each vertically stacked WG is located outside of the paths of light emitted by the other vertically stacked WGs, and therefore, does not pass through either of the other WGs. It will be appreciated that the images reflected by the WG are not altered due to passage through another WG since none of the reflected images pass through another WG. Hence, reflected image correction is required.

FIG. 4B represents the illustrative second vertically stacked WG embodiment 450, which includes first, second and third vertically stacked WGs 451, 452, 453 at a substrate 310, which include beam splitting diffractive grating surfaces 454. The arrows 456T in second non-overlapping, vertically stacked WG embodiment 450 represent the paths of light transmitted substantially parallel to the first and second major surfaces 352, 354, through the respective vertically stacked WGs 451-453. The dots 456R represent reflected light emitted from the WGs 451-453 perpendicular to a first major surface of the substrate 310. Additional details of the second horizontally stacked WG embodiment 450 will be understood from the above explanation of the embodiment 400 and will not be repeated.

Figure 5A:
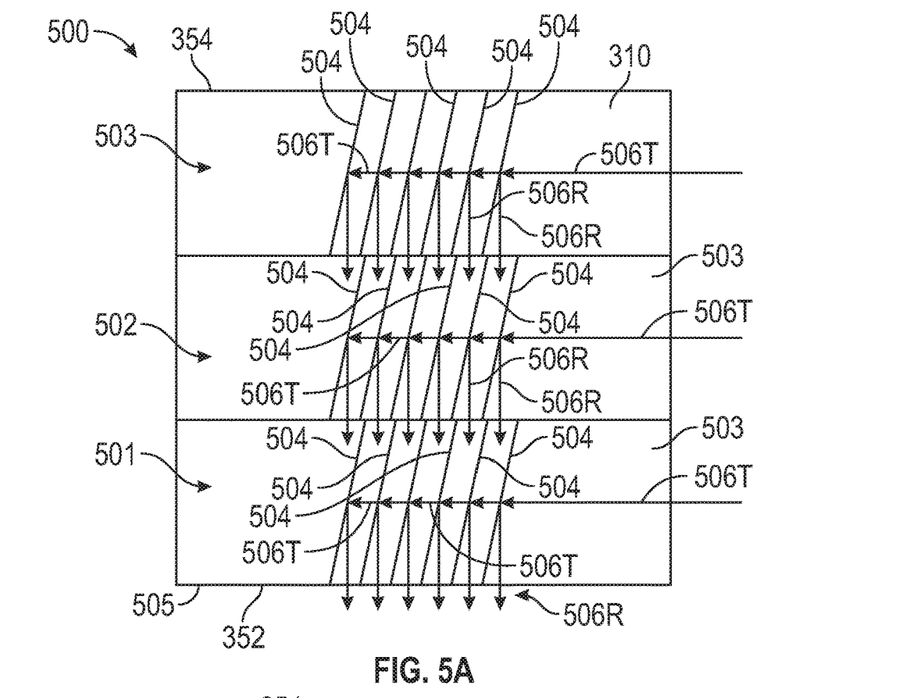
FIGS. 5A-5B, are illustrative top views of first and second embodiments of the horizontally stacked WGs of the right eyepiece of FIG. 3.
Figure 5B:
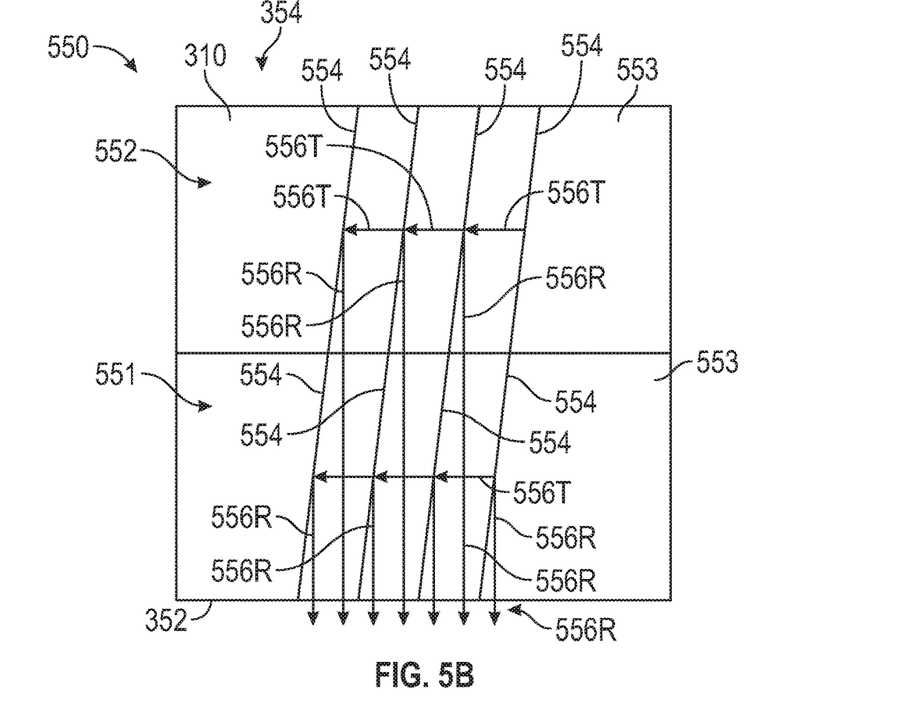

FIGS. 5A-5B, are illustrative drawings showing light ray paths within a top view of first and second overlapping, horizontally stacked WG embodiments 500, 550 of FIG. 3. As explained below, the WGs overlap since reflected light from beam splitting surfaces of WGs more distant from the first major surface 352 pass between beam splitting surfaces of WGs less distant from the first major surface 352. Also, as explained below, the WGs are horizontally stacked since each WG is at different distances from the first and second major surfaces 352, 354.

FIG. 5A represents the illustrative first horizontally stacked WG embodiment 500, which includes first, second and third horizontally stacked WGs 501, 502, 503 at substrate 310. Each of the horizontally stacked WGs 501-503 includes multiple corresponding beam splitting surfaces 504 arranged in a sequence such that individual beam splitting surfaces may reflect a portion of light incident upon it toward the first major surface 352 and transmit a portion of light incident upon it in a direction substantially parallel to the first and second major surfaces 352, 354 to a next beam splitting surface in the sequence. A last beam splitting surface in the sequence may reflect one-hundred percent of the light incident upon it toward the first major surface 352. In some embodiments, the beam splitting surfaces 504 include partially transparent beam splitting mirrors 504.

Each of the horizontally stacked WGs 501, 502, 503 extends within the substrate 310 substantially parallel to the first and second major surfaces 352, 354 at a different horizontal distance from the first major surface 352 than the other WGs. The first WG 501 is disposed within the substrate 310 spaced horizontally closest to the first (back) major surface 352 and farthest from the second (front) major surface 354. The third WG 503 is disposed within the substrate 310 spaced horizontally closest to the second major surface 354 and farthest from the first major surface 352. The second WG is disposed within the substrate 310 between the first and third WGs 501, 503. Moreover, the horizontally stacked WGs are disposed such that reflected light from WGs disposed more distant from the first major surface 352 passes between one or more adjacent beam splitting surfaces of WG disposed closer to the first major surface 352. For example, reflected light from the third WG 503 passes between beam splitting surfaces of the first and second WGs 501, 502. Also, for example, reflected light from the second WG 502 passes between pairs of beam splitting surfaces of the first WG 501. As explained below, reflected light from a WG that is more distant from the first major surface 352, which passes between two beam splitting surfaces of another WG closer to the first major surface 352, may be incident upon one of the beam splitting surfaces of that other WG.

The horizontal arrows 506T in FIG. 5A represent the paths of light transmitted substantially parallel to the first and second major surfaces 352, 354, through the respective horizontally stacked WGs 501-503 of the first horizontally stacked WG embodiment 500. Individual beam splitting surfaces 504 transmit a portion of light incident upon it parallel to the first and second major surfaces 352, 354 and reflect a portion of light incident upon it toward the first major surface 352. More particularly, the dots 506R represent portions of the light reflected from the beam splitting mirrors 504 and emitted through the first major surface 352 of the substrate 310. The light is emitted from the substrate 310 substantially perpendicular to the first major surface 352. More particularly, for example, light reflected by a beam splitting partially transparent overlapping mirror of the third WG 503 is incident upon and passes through, at least partially, one of the beam splitting partially transparent mirror surfaces 504 of each of the first and second horizontal waveguides 501-502 with which it overlaps. Light reflected by a beam splitting partially transparent overlapping mirror of the second WG 502 is incident upon and passes through, at least partially, one of the beam splitting partially transparent mirror surfaces 504 of the first horizontal waveguide 501 with which it overlaps. The light source for the backmost waveguide may need to provide the brightest light, since some light would be lost as it passes through other waveguide(s). In some embodiments, the light sources providing light to the multiple WGs 501-503 provide light of sufficient intensity that light emitted through the first major surface 352 by each WG is within thirty percent of the intensity of light emitted by the other WGs.

FIG. 5B represents the illustrative second horizontally stacked WG embodiment 550 in which the individual beam splitting surfaces 554 of first and second waveguides 551-552 have surfaces that are offset such that no reflected light from a beam splitting surface 554 of the second WG 552 is incident upon a beam splitting surface 554 of the first WG 551. The horizontal arrows 566T in FIG. 5B represent the paths of light transmitted substantially parallel to the first and second major surfaces 352, 354, through the respective horizontally stacked WGs 551-552 of the first horizontally stacked WG embodiment 550. The first WG 551 is disposed within the substrate 310 spaced horizontally less distant from the first major surface 352 than is the second WG 552. In some embodiments, the beam splitting surfaces 554 include partially reflecting mirrors. More particularly, reflected light 556R from each beam splitting partially transparent mirror surface 554 of the second WG 552 passes between pairs of adjacent beam splitting partially transparent mirror surfaces 554 of the first WG 551 without being incident upon either of pair of adjacent waveguides. Additional details of the second horizontally stacked WG embodiment 550 will be understood from the above explanation of the embodiment 500 and will not be repeated.

In some embodiments, the beam splitting surfaces 404, 504, 554 may include diffraction optics instead of partially transparent mirrors. However, since light reflected by each WG may pass through another WG, the wave front is modified. Hence, some complex image correction may be required at the source, to make sure that the accurate image reaches the eye of the observer. With partially reflective mirrors, complex image correction is not required. Although all three light sources may emit the image with different brightness. The backmost should be brightest, and the front most (nearest the eye of the user) could be dimmer as it loses no light as it does not need to pass through other waveguides.

Figure 6:
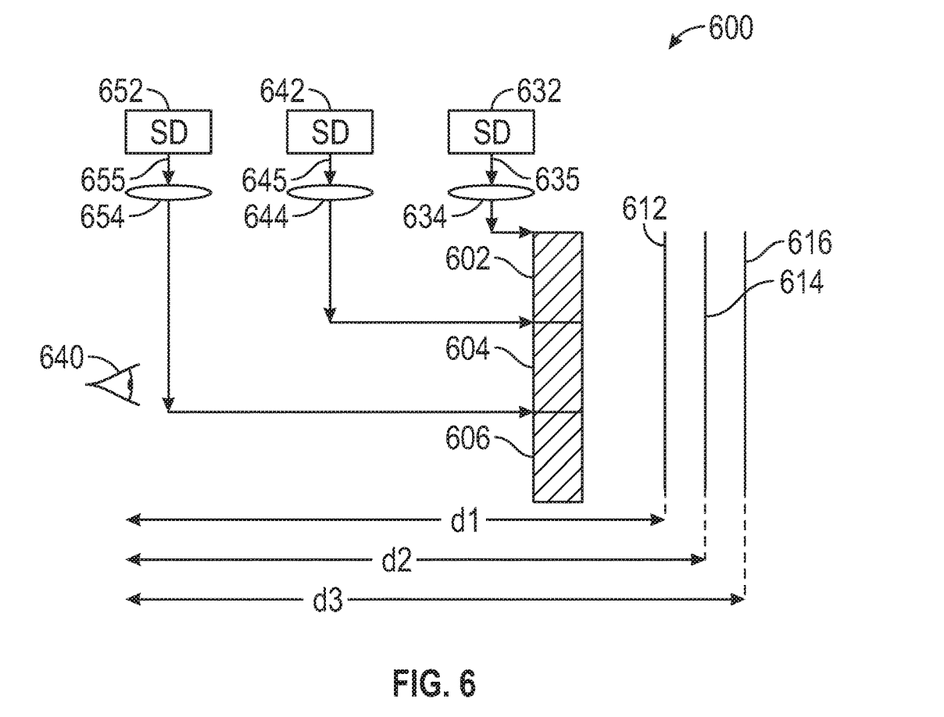
FIG. 6 is an illustrative schematic drawing representing an image display system showing a side-cross section view of multiple vertically stacked WGs to produce display images at multiple corresponding overlapping virtual image planes that are horizontally displaced from one another.

FIG. 6 is an illustrative schematic drawing representing an image display system 600 showing a side-cross section view of multiple vertically stacked WGs 602, 604, 606 to produce display images at multiple corresponding overlapping virtual image planes 612, 614, 616 that are horizontally displaced from one another. Each virtual image plane is offset by a different horizontal distance from a focal point at the eye 620 of a viewer. A first source display 632 may produce a first source image 635. A first lens system 634, which is optically coupled to the first WG 602, collimates light of the first source image 635 and focuses it at the first virtual image plane 612 at a first focus distance $d_1$ from a focal point at a user's eye 640. In some embodiments, the first source display may include an LCoS, LCD, micro LED or an OLED display, for example. The first WG 602 projects the first source image 635 to the user's eye 640 as described above with reference to FIGS. 4A-4B. Similarly, a second source display 642 may produce a second source image 645. A second lens system 644, which is optically coupled to the second WG 604, collimates light of the second source image 645 and focuses it at the second virtual image plane 614 at a second focus distance $d_2$ from a focal point at a user's eye 640. The second WG 604 projects the second source image 645 to the user's eye 640 as described above with reference to FIGS. 4A-4B. Likewise, a third source display 652 may produce a third source image 655. A third lens system 654, which is optically coupled to the third WG 606, collimates light of the third source image 655 and focuses it at the third virtual image plane 616 at a third focus distance d3 from a focal point at a user's eye 640. The third WG 606 projects the third source image 655 to the user's eye 640 as described above with reference to FIGS. 4A-4B. It will be appreciated that an observer perceives images as coming from the three virtual image panes 612, 614, 616, although the images actually come from mirrors in WG or the display; lens optics are arranged to make it appear that the images come from the virtual image panes 612, 614, 616. Thus, the vertically stacked WGs may be used to create a three-dimensional (3D) effect by producing virtual images in a user's field of view at multiple overlapping horizontally spaced apart virtual image planes. Although only one lens is depicted for each of lens systems 634, 644, 654, it will be appreciated that these may be implemented as one or more complex lens systems including of more than one lens, which may collimate the source displays and create a focus planes 612, 614, 616 for the user's eye 640.

Figure 7:
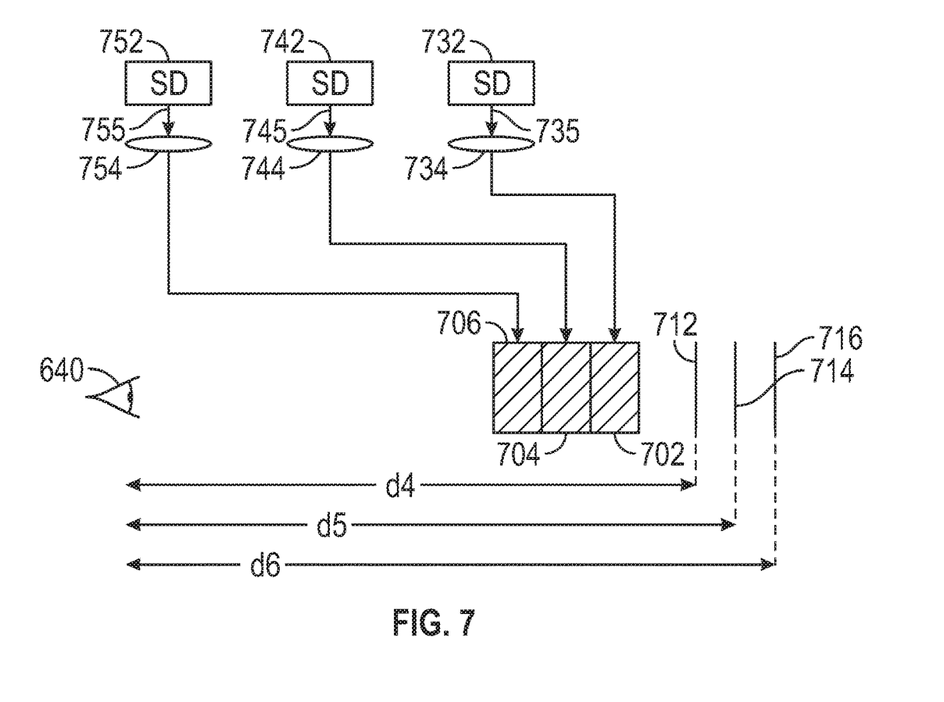
FIG. 7 is an illustrative schematic drawing representing an image display system showing a side-cross section view of multiple horizontally stacked WGs to produce display images at multiple corresponding overlapping virtual image planes that are horizontally displaced from one another.

FIG. 7 is an illustrative schematic drawing representing an image display system 700 showing a side-cross section view of multiple horizontally stacked WGs 702, 704, 706 to produce display images at multiple corresponding overlapping virtual image planes 712, 714, 716 that are horizontally displaced from one another. Each virtual image plane is offset by a different horizontal distance from a focal point at the eye 620 of a viewer. A first source display 732 may produce a first source image 735. A first lens system 734, which is optically coupled to the first WG 702, collimates light of the first source image 735 and focuses it at the first virtual image plane 712 at a fourth focus distance $d_4$ from a focal point at a user's eye 640. The first WG 702 projects the first source image 735 to the user's eye 640 as described above with reference to FIGS. 5A-5B. Similarly, a second source display 742 may produce a second source image 745. A second lens system 744, which is optically coupled to the second WG 704, collimates light of the second source image 745 and focuses it at the second virtual image plane 714 at a fifth focus distance $d_5$ from a focal point at a user's eye 640. The second WG 704 projects the second source image 745 to the user's eye 640 as described above with reference to FIGS. 5A-5B. Likewise, a third source display 752 may produce a third source image 755. A third lens system 754, which is optically coupled to the third WG 706, collimates light of the third source image 755 and focuses it focused at the third virtual image plane 716 at a sixth focus distance $d_6$ from a focal point at a common spot such as a user's eye 640. The third WG 706 projects the third source image 755 to the user's eye 640 as described above with reference to FIGS. 5A-5B. Thus, the horizontally stacked WGs may be used to create a 3D effect by producing virtual images in a user's field of view at multiple overlapping horizontally spaced apart virtual image planes. Although only one lens is depicted for each of lens systems 734, 744, 754, it will be appreciated that these may be implemented as one or more complex lens systems including of more than one lens, which may collimate the source displays and create a focus planes 712, 714, 716 for the user's eye 640.

As mentioned above, the image display source 114 to be LCoS, LCD, micro LED or an OLED, only micro LED and OLED display are self-illuminating. Other displays, including LCoS and LCD may need an external source of light, e.g. LED, not shown in the figures. One or more LEDs (e.g. Red, blue, green and white) may be used to illuminate the display.

Polarization optics (not shown), it may be used in the optical train, including near the light source, the source display, lens system, the waveguides or the partially reflecting mirrors within the waveguide.

Figure 8:
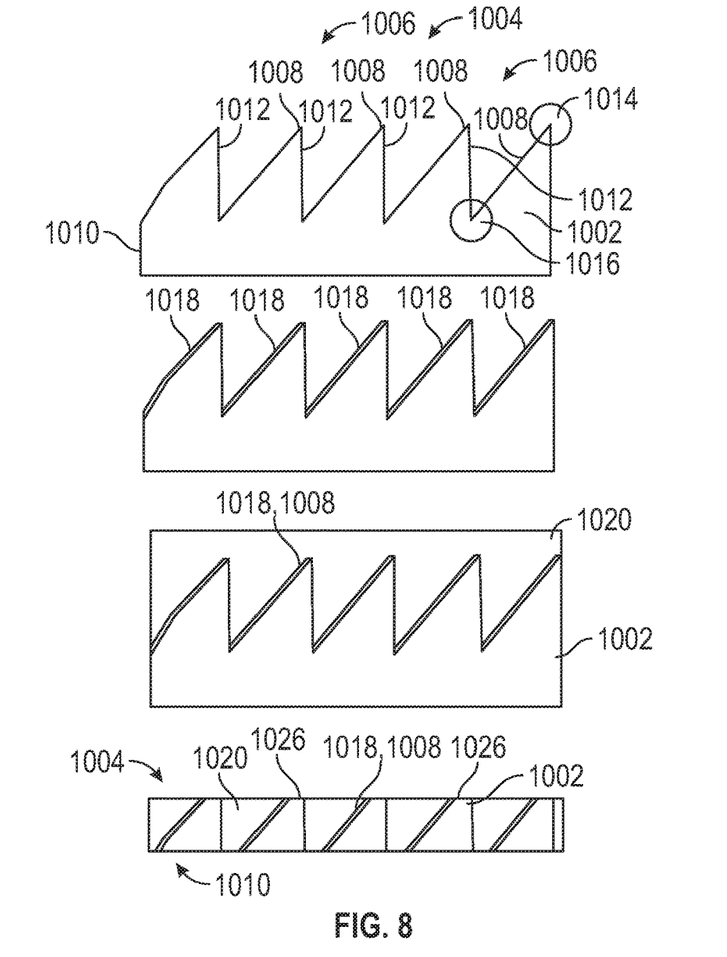
FIG. 8 is an illustrative sequence of drawings showing changes to a substrate material during manufacture of a mirror waveguide.
Figure 9:
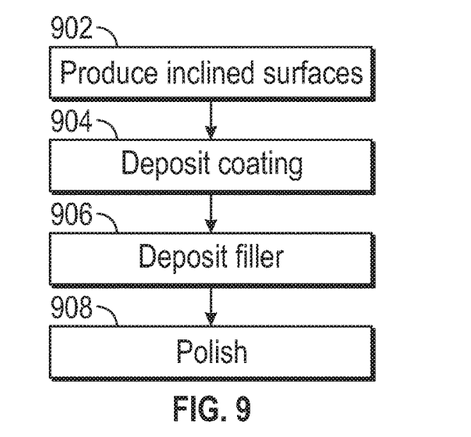
FIG. 9 is an illustrative flow diagram of a process to manufacture a mirror waveguide.

FIG. 8 is an illustrative sequence of drawings showing changes to a substrate material during manufacture of a mirror waveguide. FIG. 9 is an illustrative flow diagram of a process to manufacture a mirror waveguide. Referring to FIGS. 8-9, in a contoured surface formation step 902, a substrate structure 1002 is produced that includes a first major surface 1004 that includes contours 1006 that include an arrangement of parallel inclined surfaces 1008 and that includes a second major surface 1010 that may be planar or curved. The substrate structure 1002 may comprise a transparent glass or polymer (i.e. plastic) material and may have a refractive index $n_1$. In some embodiments, the contours 1006 include a repeating pattern of inclined surfaces 1008 that are disposed parallel to one another between intervening vertical surfaces 1012 in a sawtooth pattern. In another embodiment, the inclined surfaces 1008 are not planar, but curved. In another embodiment, the inclined surfaces are not all inclined at the same angle. A molding process may be used to produce the contoured surface 1006 that involves shaping the substrate 1002 in a liquid or pliable form using a rigid frame referred to as a mold. Alternatively, for example, the substrate structure 1002 may be formed through etching or replication. In some embodiments, contours of the peaks 1014 and valleys 1016 of the are unimportant since they are sacrificially removed during manufacturing.

In a coating step 904, the inclined surfaces 1008 are coated with a thin film 1018 to produce partially transparent mirrors thereon. The coating step may include thin film coating deposition, such as an anisotropic deposition, so only the inclined surfaces are deposited with coatings. In some embodiments, the coating may include a combination of metal coatings such as Al, Ag, Au, Pt or Hg. In some embodiments the coating may include a combination of dielectric coatings, such as magnesium fluoride, Ti-dioxide, Si-dioxide, Ta-pentoxide, or zinc sulfide, for example. A partially reflective, a reflective dielectric, or a Bragg mirror, or the combination of two or more such coatings, may also be used as layers. The coatings may be deposited via CVD, MBE, sputter, etc., for example. The coatings may include one or more layers of coatings of varying thicknesses and refractive indices, for example.

In a backfilling step 906, gaps formed at the first major surface by the presence of the inclined surfaces 1008 are filled with a transparent filler material 1020 so as to embed the coated surfaces 1018 within the transparent material 1020. The transparent filler material may be the same material as the substrate material or may be a different material such as other variety of glass or plastic having a refractive index $n_2$ that may be identical to n1, greater than n1 or smaller than n1.

In a polishing step 908, the first and second major surfaces 1022, 1024 are polished through grinding for example, to thin the substrate producing a waveguide comprising multiple partially reflective mirrors. More particularly, polishing of the first major surface 1022 of the transparent substrate material with the coating material deposited thereon and the filler material deposited thereon, remove portions of the substrate on which the coating is deposited to produce plateaus 1026, which are disposed between valleys 1016 that have been deposited with coating and with filler. The plateaus 1026 do not have coating deposited thereon, and therefore, act to separate or space apart the partially reflective mirrors of the waveguide structure. It will be appreciated that using a molding or etching is an easy and inexpensive approach to producing partially reflective mirrors that may be aligned parallel to one another.

The above description is presented to enable any person skilled in the art to create and use a stacked optical waveguide that may produce display images in multiple virtual image planes that are differently offset from the eye of a viewer. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. The terms vertical, horizontal, upper and lower have been used for convenience of explanation and are not intended to limit the way in which embodiments may be oriented or used. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. An optical apparatus comprising:
a first lens system;
a second lens system;
a substrate transparent to incident light;
a first waveguide including a first set of multiple beam splitting elements, the first set of multiple beam splitting elements arranged in a sequence along a first axis of the first waveguide, wherein the first waveguide is optically coupled to the first lens system; and
a second waveguide including a second set of multiple beam splitting elements, the second set of multiple beam splitting elements arranged in a sequence along a second axis of the second waveguide, wherein the second waveguide is optically coupled to the second lens system;
wherein the first and second waveguides are disposed in the substrate such that light reflected by a beam splitting element of the first set of multiple beam splitting elements passes between two or more beam splitting elements of the second set of multiple beam splitting elements, wherein a first surface of the first waveguide abuts a second surface of the second waveguide in the substrate, wherein the light reflected by the beam splitting element of the first set passes through the first and second surfaces, and wherein the first and second waveguides are configured to produce display images at corresponding overlapping virtual image planes horizontally offset from one another.

2. The optical apparatus of claim 1,
wherein the substrate includes opposed first and second major surfaces;
wherein the first waveguide is disposed at a first distance from the first major surface;
wherein the second waveguide is disposed at a second distance from the first major surface; and
wherein the second distance is greater than the first distance.

3. An optical apparatus comprising:
a first lens system,
a second lens system;
a substrate transparent to incident light; wherein the substrate includes opposed first and second major surfaces;
a first waveguide disposed within the substrate;
wherein the first waveguide includes multiple first beam splitting surfaces disposed in a sequence to receive incident light and to transmit a portion of the incident light to a next first beam splitting surface in the sequence and to reflect a portion of the incident light toward the first major surface, and wherein the first waveguide is optically coupled to the first lens system; and
a second waveguide disposed within the substrate;
wherein the second waveguide includes multiple second beam splitting surfaces disposed in a sequence to receive incident light and to transmit a portion of the incident light to a next second beam splitting surface in the sequence and to reflect a portion of the incident light toward the first major surface, and wherein the second waveguide is optically coupled to the second lens system;
wherein the first and second waveguides are disposed within the substrate in an overlapping arrangement such that light reflected by at least one second beam splitting surface of the second waveguide passes between and through a pair of first beam splitting surfaces of the first waveguide, wherein a first surface of the first waveguide abuts a second surface of the second waveguide in the substrate, wherein the light reflected by the at least one second beam splitting surface of the second waveguide passes through the first and second surfaces, and wherein the first and second waveguides are configured to produce display images at corresponding overlapping virtual image planes horizontally offset from one another.

4. The optical apparatus of claim 3,
wherein the first waveguide is disposed at a first distance from the first major surface;
wherein the second waveguide is disposed at a second distance from the first major surface; and
wherein the second distance is greater than the first distance.

5. The optical apparatus of claim 3,
wherein the first and second waveguides are disposed within the substrate such that light reflected by at least one second beam splitting surface of the second waveguide is incident upon at least one first beam splitting surface of the first waveguide.

6. The optical apparatus of claim 3,
wherein the first and second waveguides are disposed within the substrate such that no second beam splitting surface of the second waveguide reflects light that is incident upon a first beam splitting surface of the first waveguide.

7. The optical apparatus of claim 3,
wherein the first beam splitting surfaces of the first waveguide are arranged within the substrate to transmit a portion of the incident light in a direction substantially parallel to the first and second major surfaces; and
wherein the second beam splitting surfaces of the second waveguide are arranged within the substrate to transmit a portion of the incident light in a direction substantially parallel to the first and second major surfaces.

8. The optical apparatus of claim 3,
wherein the first and second waveguides are arranged within the substrate such that light reflected by the first beam splitting surfaces of the first waveguide and light reflected by the second beam splitting surfaces of the second waveguide is focused at a common spot.

9. The optical apparatus of claim 3,
wherein the first beam splitting surfaces include first partially reflective mirrors; and
wherein the second beam splitting surfaces include second partially reflective mirrors.

10. An optical apparatus comprising:
a substrate transparent to incident light; wherein the substrate includes opposed first and second major surfaces;
a first waveguide including multiple beam splitting elements, wherein the first waveguide emits light on a first lightpath;
a second waveguide including multiple beam splitting elements, wherein the second waveguide emits light on a second lightpath different from the first light path;

wherein the first and second waveguides are disposed in the substrate substantially equally distant from the first major surface, such that no light reflected by a beam splitting optical element of the first waveguide passes between and through beam splitting elements of the second waveguide, wherein the first waveguide abuts the second waveguide in the substrate, wherein the first lightpath and the second lightpath do not intersect.

11. The optical apparatus of claim 10,
wherein the substrate includes opposed, vertically spaced apart, first and second minor surfaces;
wherein the first waveguide is disposed at a first distance from the first minor surface;
wherein the second waveguide is disposed at a second distance from the first minor surface; and
wherein the second distance is greater than the first distance.

12. An optical apparatus comprising:
a substrate transparent to incident light; wherein the substrate includes opposed first and second major surfaces;
a first waveguide disposed within the substrate;
wherein the first waveguide includes multiple first beam splitting surfaces disposed in a sequence to receive incident light and to transmit a portion of the incident light to a next first beam splitting surface in the sequence and to reflect a portion of the incident light toward the first major surface on a first lightpath;
a second waveguide disposed within the substrate;
wherein the second waveguide includes multiple second beam splitting surfaces disposed in a sequence to receive incident light and to transmit a portion of the incident light to a next second beam splitting surface in the sequence and to reflect a portion of the incident light toward the first major surface on a second lightpath;
wherein the first and second waveguides are disposed within the substrate in a non overlapping arrangement such that no light reflected by a second beam splitting surface of the second waveguide passes between and through a pair of first beam splitting surfaces of the first waveguide and such that no light reflected by a first beam splitting surface of the first waveguide passes between a pair of second beam splitting surfaces of the second waveguide, wherein the first waveguide abuts the second waveguide in the substrate, and
wherein the first lightpath and the second lightpath do not intersect.

13. The optical apparatus of claim 12,
wherein the substrate includes opposed, vertically spaced apart, first and second minor surfaces;
wherein the first waveguide is disposed at a first distance from the first minor surface;
wherein the second waveguide is disposed at a second distance from the first minor surface; and
wherein the second distance is greater than the first distance.

14. The optical apparatus of claim 12,
wherein the first and second waveguides are arranged within the substrate such that light reflected by the first beam splitting surfaces of the first waveguide and light reflected by the second beam splitting surfaces of the second waveguide is focused at a common spot.

15. The optical apparatus of claim 12,
wherein the first beam splitting surfaces include first partially reflective mirrors; and
wherein the second beam splitting surfaces include second partially reflective mirrors.

16. The optical apparatus of claim 12,
wherein the first beam splitting surfaces include first diffractive mirrors; and wherein the second beam splitting surfaces include second diffractive mirrors.

17. The optical apparatus of claim 1, wherein:
the first lens system focuses collimated light of a first source image at a first virtual image plane of the overlapping virtual image planes, wherein the first virtual image plane corresponds to the first waveguide;
the second lens system focuses collimated light of a second source image at a second virtual image plane of the overlapping virtual image planes, wherein the second virtual image plane corresponds to the second waveguide;
the first waveguide projects the first source image to a focal point via the first set of multiple beam splitting elements; and
the second waveguide projects the second source image to the focal point via the second set of multiple beam splitting elements.

18. The optical apparatus of claim 3, wherein:
the first lens system is positioned to focus collimated light of a first source image at a first virtual image plane of the overlapping virtual image planes, wherein the first virtual image plane corresponds to the first waveguide;
the second lens system is positioned to focus collimated light of a second source image at a second virtual image plane of the overlapping virtual image planes, wherein the second virtual image plane corresponds to the second waveguide;
the first waveguide projects the first source image to a focal point via the first set of multiple beam splitting elements; and
the second waveguide projects the second source image to the focal point via the second set of multiple beam splitting elements.

19. The optical apparatus of claim 1, wherein light reflected by the beam splitting element of the first set of multiple beam splitting elements has a higher intensity than light reflected by a beam splitting element of the second set of multiple beam splitting elements.

20. The optical apparatus of claim 3, wherein light reflected by a second beam splitting surface of the second waveguide has a higher intensity than light reflected by first beam splitting surfaces of the first waveguide.

* * * * *